(12) United States Patent
Mui

(10) Patent No.: US 7,670,101 B2
(45) Date of Patent: Mar. 2, 2010

(54) PORTABLE HYDRO-GENERATOR

(76) Inventor: Richard Chin Pang Mui, 39 Jalan Rajah, #08-41 Fortuna Court, Singapore 329147 (SG)

( * ) Notice: Subject to any disclaimer, the term of this patent is extended or adjusted under 35 U.S.C. 154(b) by 695 days.

(21) Appl. No.: 10/559,553

(22) PCT Filed: May 31, 2004

(86) PCT No.: PCT/SG2004/000161

§ 371 (c)(1),
(2), (4) Date: Feb. 6, 2007

(87) PCT Pub. No.: WO2004/106731

PCT Pub. Date: Dec. 9, 2004

(65) Prior Publication Data

US 2008/0042443 A1      Feb. 21, 2008

(30) Foreign Application Priority Data

Jun. 2, 2003      (SG)      ............................ 200303232-3

(51) Int. Cl.
*F03B 9/00* (2006.01)

(52) U.S. Cl. ............................ 415/2.1; 415/7; 415/906; 416/20 A; 416/197 A; 416/DIG. 4

(58) Field of Classification Search .................. 415/2.1, 415/3.1, 5, 7, 905, 906; 416/20 A, 197 A, 416/DIG. 4
See application file for complete search history.

(56) References Cited

U.S. PATENT DOCUMENTS

| 4,054,031 A | 10/1977 | Johnson |
| 4,345,160 A | 8/1982 | Smith |
| 4,950,130 A * | 8/1990 | Erlach .......................... 415/202 |
| 6,305,165 B1 * | 10/2001 | Mizuki, Sr. .................. 60/496 |

FOREIGN PATENT DOCUMENTS

| GB | 2 267 317 A | 12/1993 |
| RU | 2 108 482 C1 | 4/1998 |

OTHER PUBLICATIONS

Subbarayan, R., International Search Report, PCT/SG2004/000161, dated Sep. 14, 2005, 5 pages, Australian Patent Office.

* cited by examiner

*Primary Examiner*—Igor Kershteyn
(74) *Attorney, Agent, or Firm*—Fliesler Meyer LLP

(57) ABSTRACT

A portable hydro-generator, for the generation of power, including a tower (10) filled with a driving fluid, a semi-sealed curved tubular housing with a drive portion and a return portion primed with a fluid, the drive portion having a larger diameter than the return portion, an inlet to allow the fluid to enter the tubular housing, a plurality of paddles to harness the kinetic energy of the fluid entering the curved tubular housing, a linkage assembly to link the plurality of paddles, a drive chamber, a sprocket within the drive chamber to engage a portion of the paddles, and an output power generator attached to the sprocket. A paddle adapted to be used in the hydro-generator include a top surface, a bottom surface, seals to prevent water leakage through the paddles, a linkage bar to allow an attachment of the paddle to subsequent paddle, wherein the top surface of the paddle further includes studs to increase the effective surface area of the top of the paddle.

23 Claims, 3 Drawing Sheets

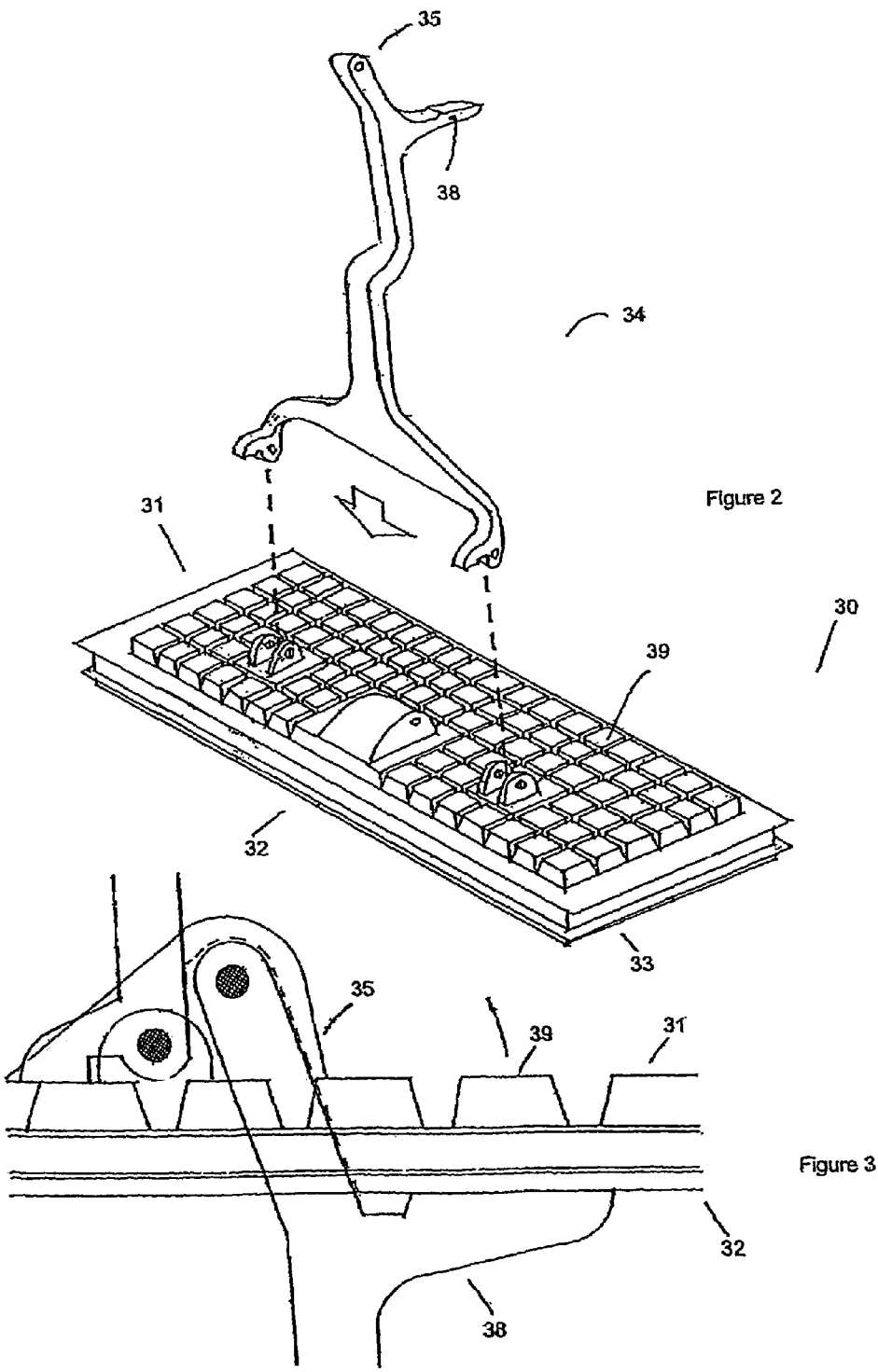

PORTABLE HYDRO-GENERATOR

FIELD OF INVENTION

The present invention relates to a novel way of harnessing and renewing fluid energy to generate power and/or electricity

BACKGROUND OF THE INVENTION

There have been various attempts to generate power of electricity. These attempts can be broadly categorized as the use of depletable resources, and the use of renewable energy.

Current depletable resources include coal, oil and nuclear energy. These resources are known to be pollutive not only upon extraction, and also when these resources are being used. Further, these resources are not freely available in all parts of the world, and regions who possess these resources, may tend to hold the rest of the world 'at ransom'. More importantly, the negative side effects of the use of nuclear energy may even be long term.

Notwithstanding the negative impacts of these depletable resources, they are currently still being mined, as they are the traditional energy resources. Thus, these resources are being threatened.

The long-term solution is to engage and harness known renewable energies, for example, solar energy, wind energy and hydraulic energy.

Most known attempts which operate using renewable energies work on very tight parameters as they rely solely on the presence of these renewable energies, and the fact that these energies are seasonal and unpredictable. These are not always found where they are needed. For example, when hydraulics are used as a power generating source, the power generation machines will need to be physically built at or around moving water, for example, rivers or near dams. This may not always be economically feasible, and may require rather long term payback.

In another example, renewable energy like solar energy is limited during wintry periods, when power or electricity generation is needed more.

A solution to this is an arrangement to channel excess energies to batteries for use during off load periods. However, these batteries not only are expensive, but also have a relatively short life span and are toxic. Most importantly, due to the relatively short life span, the continued disposal of these toxic substances are pollutive to the environment.

There is thus a need to alleviate and ameliorate all of these problems as highlighted above.

SUMMARY OF INVENTION

It is thus an object of the invention to provide a portable hydro-generator, for the generation of power, including a tower filled with a driving fluid, a semi-sealed curved tubular housing with a drive portion and a return portion primed with a fluid, said drive portion and return portion having differing tubular internal diameters, an inlet means to allow said fluid to enter said semi-sealed curved tubular housing, a plurality of paddles to harness a kinetic energy of said fluid entering said semi-sealed curved tubular housing, a linkage assembly to link said plurality of paddles, a drive chamber; a sprocket within said drive chamber to engage a portion of said paddles, any output power generator attached to said sprocket, wherein said drive portion of semi-sealed tubular housing has a larger diameter than the return portion.

Preferably, the drive portion further includes a pre-pressure chamber and a pressure chamber.

Still preferably, the inlet means allow said fluid to enter the semi-sealed tubular housing at the drive portion.

In a preferred embodiment, the paddles are hinged to allow a stretched position and a closed position.

Preferably, the paddles are in a stretched position at the drive portion.

Still preferably, the paddles are in a closed position at the return potion.

In a preferred embodiment, the semi-sealed curved tubular housing further includes a wedge at the drop off portion.

Preferably, the paddles interact with the wedge to rotate from a stretched position to a closed position, In another preferred embodiment, the semi-sealed tubular housing further includes guide walls to maintain the position of the paddles.

Preferably, the guide walls maintain the paddles in a closed position at the return portion.

In yet another preferred embodiment, the tower is positioned above said drive portion to effect a pressure head on the drive portion.

Preferably, the portable hydro-generator further includes a lower receptacle tank.

Preferably, the return portion further includes a drop off point.

In a preferred embodiment, the semi-sealed tubular enclosure is open to environmental pressures just after the drop off point and before the lower receptacle tank.

In yet another preferred embodiment, the paddles rotatably interacts with the sprocket wheel.

In another preferred embodiment, the lower receptacle tank further includes an overflow tank.

Preferably, the overflow tank further includes a pump, to pump overflow water back to the tower.

Preferably, the drive chamber further includes an abutment to allow paddles in a closed position to rotate to a stretched position.

Preferably, the abutment is positioned just after a top dead center of the sprocket wheel.

Preferably, the paddles are positioned such that the drive portion is sealed.

In a preferred embodiment, the inlet means are a system of conduits.

According to an aspect of the invention, there is provided a paddle, adaptable to be used in any one of the preceding claims, including a top surface, a bottom surface, seals to prevent water leakage through the paddles, a linkage bar to allow an attachment of said paddle to a subsequent paddle, wherein the top surface of the paddle further includes studs to increase the effective surface area of the top surface of the paddle.

Preferably, the paddle is made of a water resistant material.

DESCRIPTION OF FIGURES

FIG. 2 shows a perspective view of the paddle and linkage assembly

FIG. 3 shows a side view of the linkage when engaged with the paddle

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill of the art that the present invention may be practiced without these specific details. In other instances, well known methods, procedures, components, and features have been described in detail so as not to unnecessarily obscure aspects of the present invention.

Figure 1:
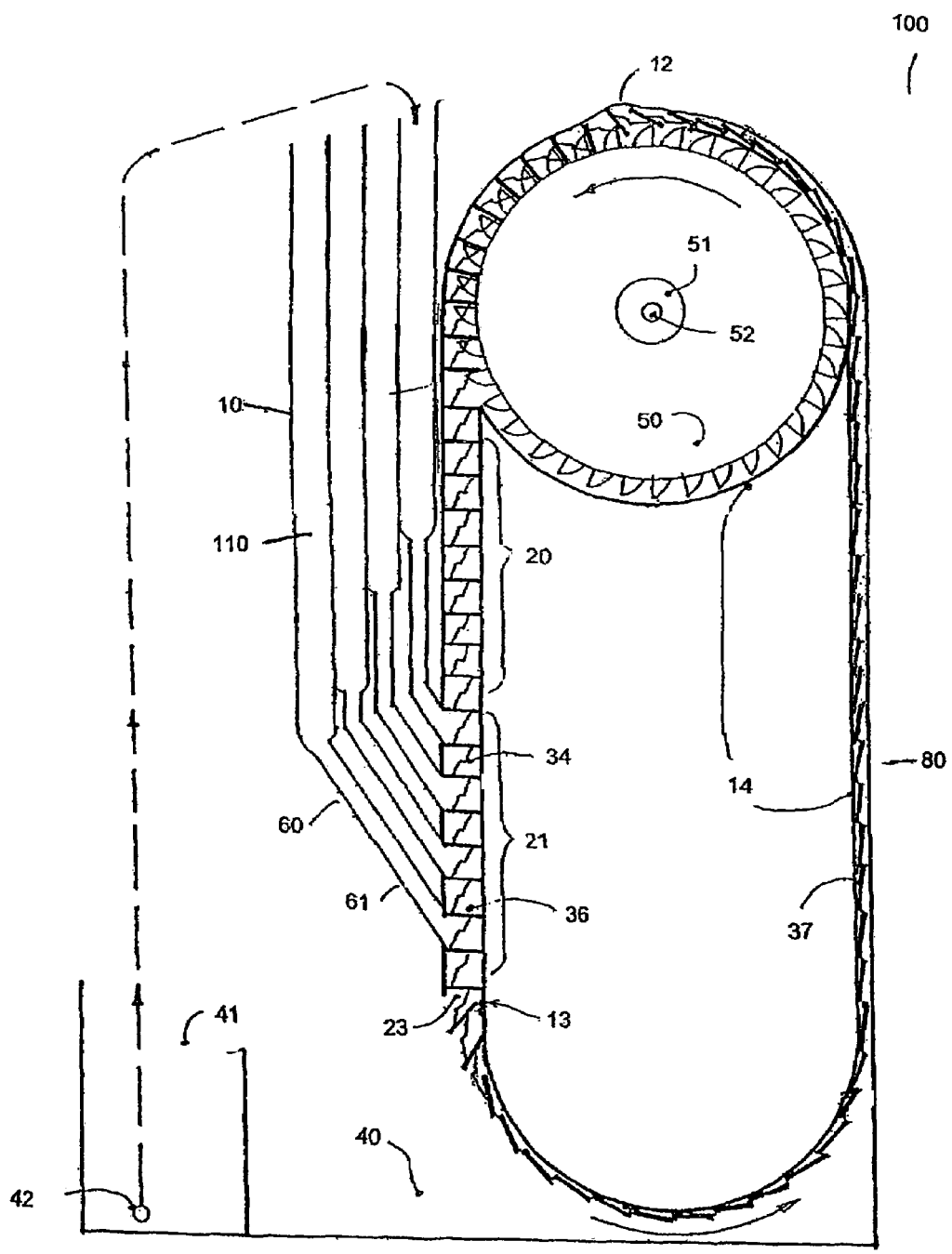
FIG. 1 shows the preferred embodiment of the portable hydro-generator

The portable hydro-generator 100 in a preferred embodiment is as depicted in FIG. 1 of the drawings. The portable hydro-generator 100, includes a tower 10, which is filled with a driving fluid 110. The driving fluid 110 is introduced into a semi-sealed tubular housing 80 through the inlet means 60, which, in a preferred embodiment, is a series of conduits 61. The semi-sealed tubular housing 80 is defined as having a drive portion 81, a return portion 82 and an output chamber 83. The semi-sealed tubular housing 80 is previously primed with a fluid 70. When the driving fluid 110 from the tower 10 flows through the series of conduits 61 via potential energy, this potential energy transforms to kinetic energy, thus allowing the driving fluid 110 impinges on the fluid 70 at the drive portion 81 of the semi-sealed tubular housing 80. The region of the drive portion 81 where the driving fluid 110 impinges on the primed fluid 70 within the semi-sealed tubular housing 80 is known as the pressure chamber 21. It is the pressure chamber 21 that the main input energy is received for the portable hydro-generator 100. It is to be appreciated that whilst it is preferred that the level of the driving fluid 110 in the tower 10 is as high as possible to create a higher pressure head, it is understood that the difference in height between the level of the driving fluid 110, and the height of the output chamber 83, will determine the amount of backflow occurring. The level of driving fluid 110 within the tower 10 is preferably slightly higher than the output chamber 83, to minimize a backflow occurring within the semi-sealed tubular housing 80 of the portable hydro-generator 100, and also to create a high pressure head to allow a greater impinging force on the fluid 70.

It is to be understood that the driving fluid 110, and the fluid 70, are the same fluid, and have been defined as such for the purposes of explaining the present invention in greater detail. Further, as the present invention is intended to be for use in domestic and industrial applications, this fluid is preferably a fluid commonly used and found, and is preferred to be water.

A series of paddles 30 is linked within the periphery of the tubular housing 80, and is the main conveyance of the impinging force introduced to the portable hydro-generator 100, via the pressure chamber 21. The paddles 30 are linked by means of a linkage assembly, which, in a preferred embodiment, and as shown in FIG. 1, is a linkage bar 34. It is to be appreciated that the paddles 30 are in a stretched position 36 when in the drive portion 80, and in a closed position 37 when in the return portion 82.

As the driving fluid 110 is introduced into the pressure chamber 21, the potential energy possessed by this fluid 110 by virtue of the height of the tower 10 above the pressure chamber 21 is transformed to kinetic energy, and the driving fluid 110 is allowed to impinge on the primed fluid 70 of the semi-sealed tubular housing 80. This initial force causes the paddles 30 within the pressure chamber 21 to move downwards, and to turn towards the return portion 82. As the tubular housing 80 is previously primed, the fluid 70 within the drive chamber will also move downwards. Further, as the paddles 30 are linked through a linkage assembly, the subsequent paddles will also begin to move in an anti-clockwise direction, as shown in FIG. 1. To ensure that the maximum kinetic energy from the driving fluid 110 is harnessed, the paddles 30 are maintained in a stretched position 36 throughout the drive portion 81 by means of a stop means 38 on the paddle 30. This stop means 38 will prevent the paddles 30 from rotating to a closed position 37. Further, to minimize resistive forces, the paddles 30 have to be in a closed position 37 at the return portion 82. This is done by including a wedge 13 at a drop off point 23. This wedge 13 tilts the paddle 30, so that it will be rotated to a closed position 37. Subsequent paddles 30 that pass through the wedge 13 will also rotate to a closed position 37. This wedge 13, in a preferred embodiment, is a protrusion from the inner wall of the semi-sealed tubular housing 80. It is envisioned that the wedge 13, can be in the form of a plurality of wedges 13, and it can be provided on the guide walls 14 of the semi-sealed tubular housing 80. It is further to be understood that the wedge 13 may be at a position after the drop off point 23, and not directly at the drop off point 23.

It is at the drop off point 23, where the tubular housing 80 is exposed to environmental pressures. To maintain the tubular housing 80 in a primed condition, the portable hydro-generator 100 is further fitted with a lower receptacle tank 40. The height of the lower receptacle tank 40 is such that it is lower than the height of the drop off point 23, so as to maintain a region of atmospheric pressure on the drive portion 81, thus creating a larger imbalance, or greater driving force on the drive portion, and comparatively less resistive force on the return portion 82. The lower receptacle tank 40 is further fitted with an overflow tank 41 with a return pump 42 so that the level of driving fluid 110 in the tower 10 can be maintained. The level of fluid 70 within the lower receptacle is known as the perceived fluid level, and it is appreciated that the perceived fluid level maintains at the level height of the overflow tank 41.

It is to be appreciated that the internal diameter of the tubular housing 80 is of a larger diameter at the drive portion 81 than at the return portion 82. This is to further allow an imbalance within the tubular housing 80, such that the downward force at the drive portion 81 is greater than the upward resistive force of the return portion 82, and hence, create a net anti-clockwise rotation of the primed fluid 70, and also the paddles 30.

Once the paddles 30 rotate to a closed position 37 after passing through the wedge 13, the paddles 30 are moved to the return portion 82. To maintain the paddles 30 at a closed position 37, the tubular housing 80 has guide walls 14, which maintain a minimum internal diameter with the wall of the tubular housing 80 to maintain the closed position 37 of the paddles 30. At this closed position 37 at the return portion 82, the upward resistance is minimized. The output chamber 83 is preferably situated at the top of the tubular housing 80 as seen in FIG. 1. The output chamber 83 houses the sprocket wheel 50. The output chamber 83 further includes an abutment 12, to allow the paddles 30 to rotate from a closed position 37 to a stretched position 36 such that it interacts with the sprocket wheel 50 to rotate it. The guide walls 14, extend from the return portion 82, to the output chamber 83, and ends just before the abutment 12, so that the closed position 37 of the paddles 30, are maintained till that point, to minimize upward resistance. It is to be appreciated that when the paddles 30 rotate to a stretched position 36 at the abutment 12, the position of the paddle 30 is such that it provides a seal, so that there will be no backflow occurring, which would compromise the driving force from the pressure chamber 21. The abutment 12 is positioned right after the top dead center of the sprocket wheel 50 so that the downward force acting on the sprocket wheel 50 by the paddles 30 in a stretched position 36 is more effective.

FIG. 2 shows a perspective view of the paddle 30 and linkage assembly. The linkage assembly is shown in the preferred embodiment as a linkage bar 34. The paddle 30 consists of a top surface 31 and a bottom surface 32. The top surface 31 includes studs 39 so that the surface area of the top surface 31 is increased. This is to ensure that more force can be obtained by the pressure exerted on the top surface 31 of the paddle 30. The circumference of the paddle 30 further includes seals 33, to ensure a tight fit with the internal diameter of the semi-sealed tubular housing 80 when in a stretched position 36. The paddle 30 is hingedly connected to a linkage bar 34 on the top surface 31, as seen in FIG. 2. To link a subsequent paddle 30, the other end of the linkage bar 34 is fitted with an engagement means 35 to attach to the bottom surface 32 of the subsequent paddle 30. The engagement means 35 further includes a stop means 38 to prevent the subsequent paddle from freely rotating.

FIG. 3 shows the engagement means 35 connected to a subsequent paddle 30. The stop means 38 is shown whereby it stops the paddle 30 from over rotating.

Figure 4:
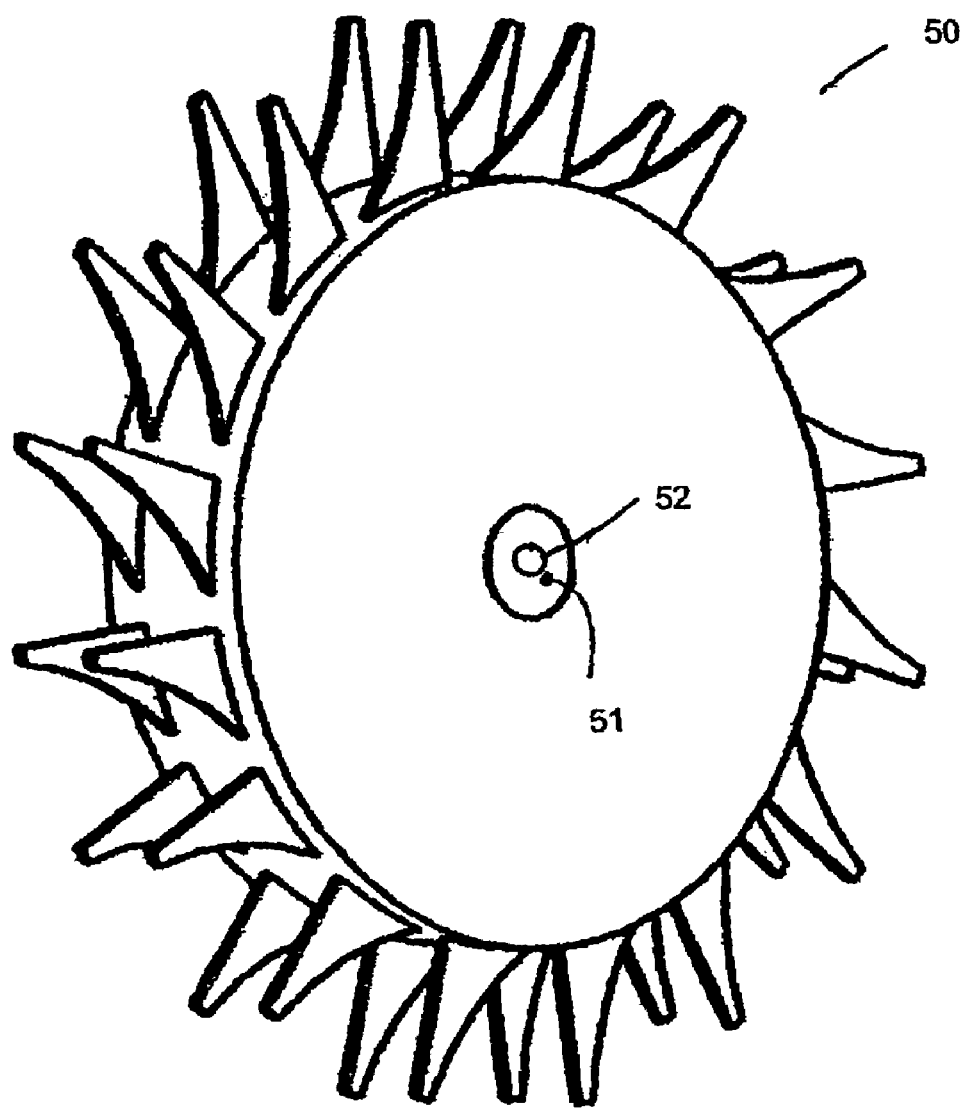
FIG. 4 shows the perspective view of a sprocket wheel

The sprocket wheel, as seen in FIG. 4, includes a bearing cap 51 and shaft housing 52. The shaft housing can be coupled to any output generator for the generation of power or electricity.

The invention claimed is:

1. A portable hydro-generator, for the generation of power, including
    a tower filled with a driving fluid;
    a semi-sealed curved tubular housing with a drive portion and a return portion primed with a fluid, said drive portion and return portion having differing tubular internal diameters;
    an inlet means to allow said fluid to enter said semi-sealed curved tubular housing;
    a plurality of paddles to harness a kinetic energy of said fluid entering said semi-sealed curved tubular housing;
    a linkage assembly to link said plurality of paddles;
    a drive chamber;
    a sprocket within said drive chamber to engage a portion of said paddles;
    a power generator attached to said sprocket;
    wherein said drive portion of semi-sealed tubular housing has a larger diameter than the return portion.

2. A portable hydro-generator, for the generation of power according to claim 1, wherein said drive portion further includes a pre-pressure chamber and a pressure chamber.

3. A portable hydro-generator, for the generation of power according to claim 1 wherein the inlet means allow said fluid to enter the semi-sealed tubular housing at the drive portion.

4. A portable hydro-generator, for the generation of power according to claim 1 wherein the paddles are hinged to allow a stretched position and a closed position.

5. A portable hydro-generator, for the generation of power according to claim 4 wherein the paddles are in the stretched position at the drive portion.

6. A portable hydro-generator, for the generation of power according to claim 4 wherein the paddles are in the closed position at the return portion.

7. A portable hydro-generator, for the generation of power according to claim 1 wherein the semi-sealed tubular housing further includes guide walls to maintain the position of the paddles.

8. A portable hydro-generator, for the generation of power according to claim 7, wherein the guide walls maintain the paddles in a closed position at the return portion.

9. A portable hydro-generator, for the generation of power according to claim 1 wherein the tower is positioned above said drive portion to effect a pressure head on the drive portion.

10. A portable hydro-generator, for the generation of power according to claim 1 wherein the portable hydro-generator further includes a lower receptacle tank.

11. A portable hydro-generator, for the generation of power according to claim 10, wherein the return portion further includes a drop off point.

12. A portable hydro-generator, for the generation of power according to claim 11 wherein the semi-sealed curved tubular housing further includes a wedge at the drop-off point.

13. A portable hydro-generator, for the generation of power according to claim 12 wherein the paddles interact with the wedge to rotate from a stretched position to a closed position.

14. A portable hydro-generator, for the generation of power according to claim 10 wherein the semi-sealed tubular enclosure is open to environmental pressures just after the drop off point and before the lower receptacle tank.

15. A portable hydro-generator, for the generation of power according to claim 1 wherein the paddles rotably interacts with the sprocket.

16. A portable hydro-generator, for the generation of power according to claim 1 wherein the lower receptacle tank further includes an overflow tank.

17. A portable hydro-generator, for the generation of power according to claim 1 wherein the overflow tank further includes a pump, to pump overflow water back to the tower.

18. A portable hydro-generator, for the generation of power according to claim 1 wherein the drive chamber further includes a an abutment to allow paddles in a closed position to rotate to a stretched position.

19. A portable hydro-generator, for the generation of power according to claim 18 wherein the abutment is positioned just after a top dead center of the sprocket.

20. A portable hydro-generator, for the generation of power according to claim 1 wherein the paddles are positioned such that the drive portion is sealed.

21. A portable hydro-generator, for the generation of power according to claim 1 wherein the inlet means is a system of conduits.

22. A paddle, adaptable to be used in claim 1, including
    a top surface;
    a bottom surface;
    seals to prevent water leakage through the paddles;
    a linkage bar to allow an attachment of said paddle to a subsequent paddle;
    wherein the top surface of the paddle further includes studs to increase the effective surface area of the top surface of the paddle.

23. A paddle according to claim 22, wherein the paddle is made from a water resistant material.

* * * * *